United States Patent [19]
Dendi

[11] Patent Number: 5,805,691
[45] Date of Patent: Sep. 8, 1998

[54] SYSTEM AND METHOD FOR SAFELY AND EFFICIENTLY REDIRECTING A TELEPHONE CALL

[75] Inventor: Ranga R. Dendi, Plano, Tex.

[73] Assignee: MCI Corporation, Washington, D.C.

[21] Appl. No.: 654,178

[22] Filed: May 28, 1996

[51] Int. Cl.[6] .............................. H04M 7/00; H04J 1/16; H04J 3/14

[52] U.S. Cl. .................. 379/221; 370/217; 370/385; 379/230

[58] Field of Search .................................... 379/219, 220, 379/221, 229, 230, 269, 279; 370/217, 225

[56] References Cited

U.S. PATENT DOCUMENTS

| | | | |
|---|---|---|---|
| 5,345,503 | 9/1994 | Lee | 379/221 |
| 5,432,845 | 7/1995 | Burd | 379/210 |
| 5,548,639 | 8/1996 | Ogura et al. | 379/221 |

Primary Examiner—Harry S. Hong

[57] ABSTRACT

A system and method for efficient routing of communication paths in a telecommunications system. The system comprises a telecommunications network having a pivot node, a destination node, and a release node connected to the pivot node and having a possible connection to the destination node. The method includes attempting to establish a direct connection between the destination node and the pivot node. An attempt is initially made to establish a direct connection between the destination node and the pivot node. If the destination node and the pivot node can be connected directly, then the connection between the pivot node and the release node is released. If the attempt to directly connect the destination node and the pivot node fails, a direct connection is established between the destination node and the release node. The failure to connect the destination node and the pivot node can be indicated by two methods. In the pivot method, the pivot node sends a failure indication to the release node. In the destination method, a timer is started in the release node when the connection attempt begins; the expiration of the timer indicates failure.

12 Claims, 8 Drawing Sheets

SYSTEM AND METHOD FOR SAFELY AND EFFICIENTLY REDIRECTING A TELEPHONE CALL

BACKGROUND OF THE INVENTION

Related Application

This application is related to a commonly owned application, filed concurrently herewith, entitled "System and Method for Branching a Telephone Call" having application Ser. No. 08/654,296, which is incorporated herein by reference.

Field of the Invention

The present invention relates generally to systems and methods for network switching, and more particularly to efficient routing of communication paths in a telecommunications system.

Related Art

A conventional telecommunications network comprises three basic components: user terminals (for example, telephones), communications busses (also known as links; for example, telephone lines) and nodes. The nodes are used to selectively connect the user terminals via the links. A node is a functional entity employed to route a call, not a physical entity. Therefore, the correspondence between nodes and physical switches is not necessarily one-to-one.

When a connection is required from one user terminal to another (or even from one node to another), network resources are allocated to complete the connection (for example, to route a call); that is, some of the nodes are manipulated to interconnect some of the links to form a communications path between the user terminals. Because these network resources are scarce, one goal of network resource allocation is to find the communications path that involves the fewest nodes.

Often, a need will arise for a telephone call to be redirected. This may happen, for example, when a caller calls an operator to find a telephone number for a party the user wishes to call, and then the operator connects the caller to the called party. The call can then be extended via the operator to the called party. The disadvantage of this approach is that this routing may be inefficient; that is, the routing may involve more nodes than necessary. What is needed is a way to reroute the call to involve fewer nodes.

A conventional approach, known as Release to Pivot (RTP), has been developed to meet this need. In RTP, a node providing an indirect connection between two other nodes (such as the operator's node in the above example) is termed the "release" node. Of the other two nodes, the node connected, directly or indirectly, to the originating user terminal (for example, a caller's telephone) is termed the "pivot" node, and the node nearest to the terminating user terminal (for example, the telephone of the party called) is termed the "destination" node. Under the RTP scheme, when the release node determines that a direct connection may be had between the pivot and destination nodes, it releases its connection with the pivot node. The pivot node then attempts a direct connection with the destination node. If successful, the resulting connection involves only two nodes (the pivot and destination nodes), rather than three.

The principal disadvantage of the RTP scheme arises when the pivot node is not successful in its attempt to establish a direct connection with the destination node. When this happens, no connection is possible between the pivot node and the destination node because the release node has released its connection with the pivot node. Because the connection is not possible, the communications path between the user terminals cannot be completed (for example, the call is dropped).

What is needed, therefore, is a method for efficiently routing a call while ensuring the call's completion.

SUMMARY OF THE INVENTION

The present invention is a system and method for efficiently routing a call while ensuring the call's completion. The present invention is described in terms of a three-node network configuration. The node connected, directly or indirectly, to the originating user terminal of the communications path is termed the "pivot" node. The node nearest to the terminating user terminal of the communications path is termed the "destination" node. A third node, termed the "release" node, is connected to the pivot node and has a possible connection to the destination node, thereby providing a possible indirect communications path between the pivot and destination nodes. This three-node configuration can be located anywhere in a network of many nodes, as long as the three nodes are directly connected to one another as described above. Also, the connection between the pivot and release nodes, and the connection between the pivot and destination nodes, need not be direct, but may involve one or more transparent nodes.

The present invention attempts to connect the pivot and destination nodes directly. If the attempt succeeds, the communications path is shortened by one node—the release node. If the attempt fails, the original communications path—via the release node—is restored. The failure can be indicated to the release node in at least two ways. First, the pivot node can inform the release node of the failure. Second, the failure can be indicated by the expiration of a timer in the release node. When the failure is indicated, the release node completes the connection to the destination node, thereby providing a communications path from the pivot node to the destination node via the release node.

One advantage of the present invention is that it permits rerouting a communications path so as to reduce the number of nodes involved. Another advantage of the present invention is to that it permits restoration of the original communications path if the rerouting cannot be accomplished.

Further features and advantages of the present invention as well as the structure and operation of various embodiments of the present invention are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE FIGURES

The present invention will be described with reference to the accompanying drawings, wherein.

DETAILED DESCRIPTION OF THE PREFERRED EMBODIMENTS

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention.

The present invention is a system and method for efficiently routing a call while ensuring the call's completion. For ease of discussion, the present invention is discussed in terms of a simple three-node configuration. As will be apparent to one skilled in the relevant art, other configurations may be employed without departing from the spirit and scope of the present invention.

Figure 1:
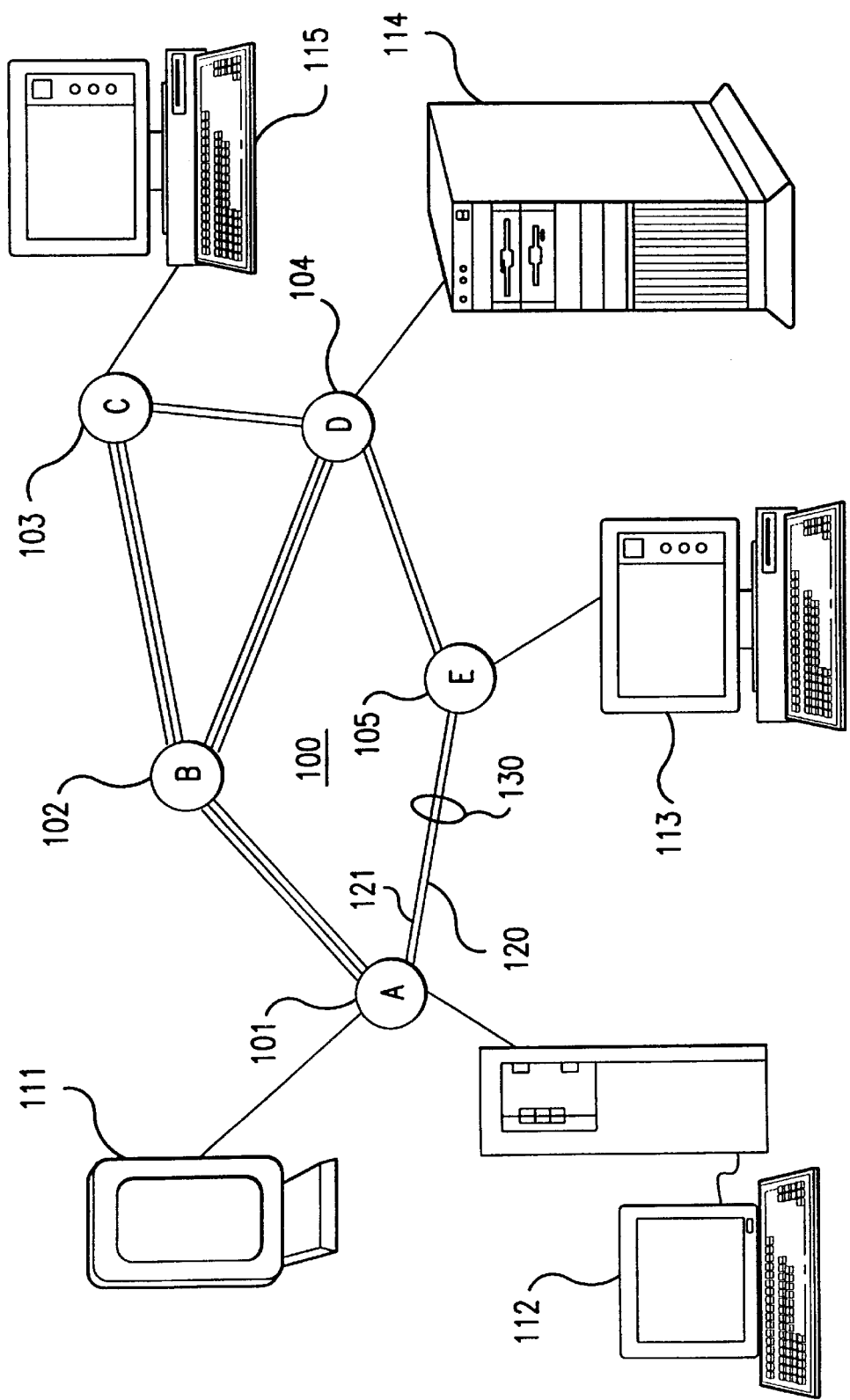
FIG. 1 shows a typical communications network consisting of nodes connected by links.

Before describing the operation of the present invention, an environment in which the invention may be employed is first described. FIG. 1 shows a typical communications network 100 consisting of nodes 101–105 connected by links 120–121. The communications system 100 routes data so as to effectively interconnect data equipment 111–115 that are located at a distance from one another. This routing is accomplished within the network by the ability of each node 101 to perform one-of-many switching functions, that is, to accept data entering along one link and send the data out along a different link. Under normal circumstances, the switching within each node is directed by some overall network routing logic commonly understood by those skilled in the art.

Figure 2:
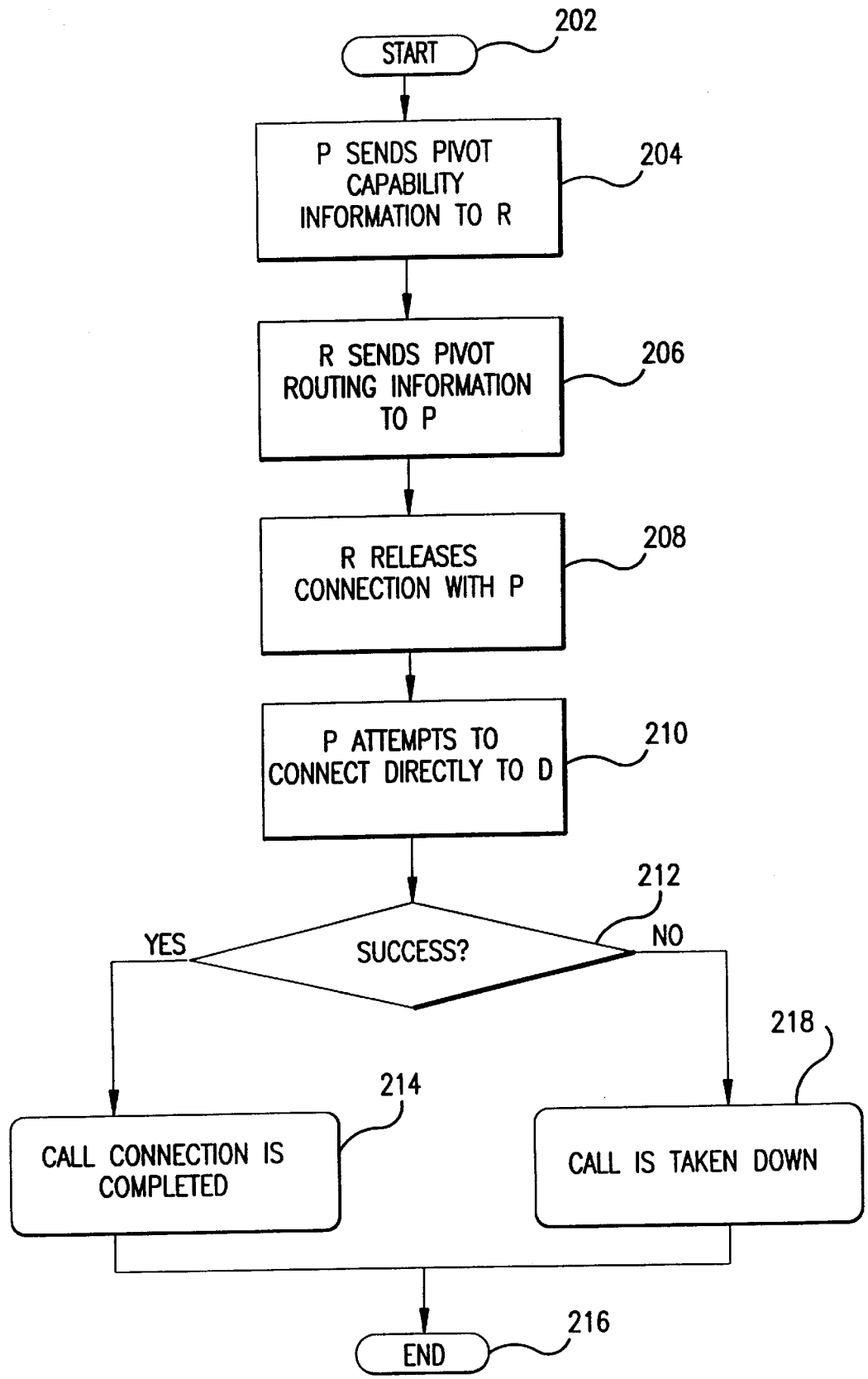
FIG. 2 is a flowchart depicting the operation of a conventional network resource allocation mechanism known as RTP.

FIG. 2 is a flowchart depicting the operation of a conventional network resource allocation mechanism known as RTP. FIGS. 3A–3E depict a configuration of three network nodes useful in describing RTP operation. The configuration comprises "pivot" node 302, "release" node 304, and "destination" node 306. Typically, pivot node 302 is connected, directly or indirectly, to an originating user terminal (not shown), and destination node 306 is to be connected, directly or indirectly, to a terminating user terminal (also not shown). According to RTP, both pivot node 302 and release node 304 support common channel signaling (CCS); destination node 306 may or may not support CCS. CCS is a method of signaling whereby the paths taken by control signals are independent of the associated communications path. CCS can be contrasted to inband signaling, where the path taken by the control signals is the same as the associated communications path. This three-node configuration can be located anywhere in a network of many nodes, as long as the three nodes are directly or indirectly connected to one another as described above.

Figure 3B:
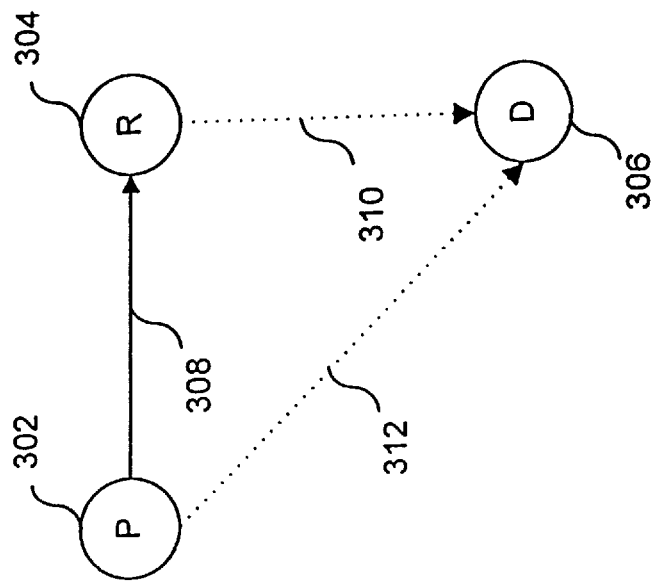
FIGS. 3A–3E depict a network of three nodes useful in describing the operation of a conventional mechanism.
Figure 3A:
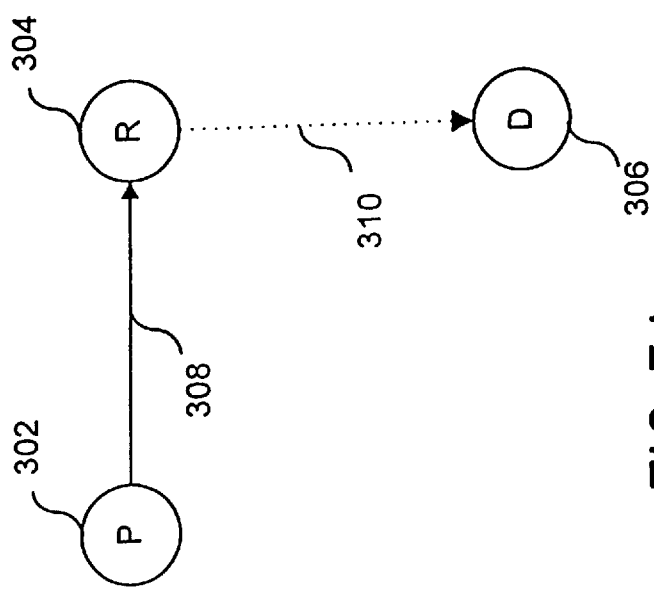

FIG. 3A depicts an initial stage in the connection of pivot node 302 to destination node 306. In FIG. 3A, connection 308 has been made between pivot node 302 and release node 304, and a possible connection 310 has been detected between release node 304 and destination node 306. Thus, an indirect connection is possible between pivot node 302 and destination node 306 via release node 304 using connections 308 and 310.

FIG. 3B depicts a further stage in the connection of pivot node 302 to destination node 306. In FIG. 3B, release node 304 has detected a possible direct connection 312 between pivot node 302 and destination node 306. This stage corresponds to start step 202 in FIG. 2.

Figure 3D:
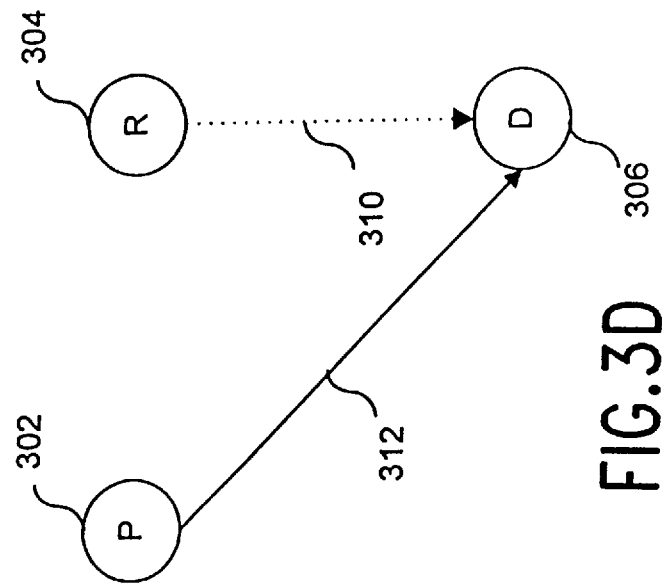
Figure 3C:
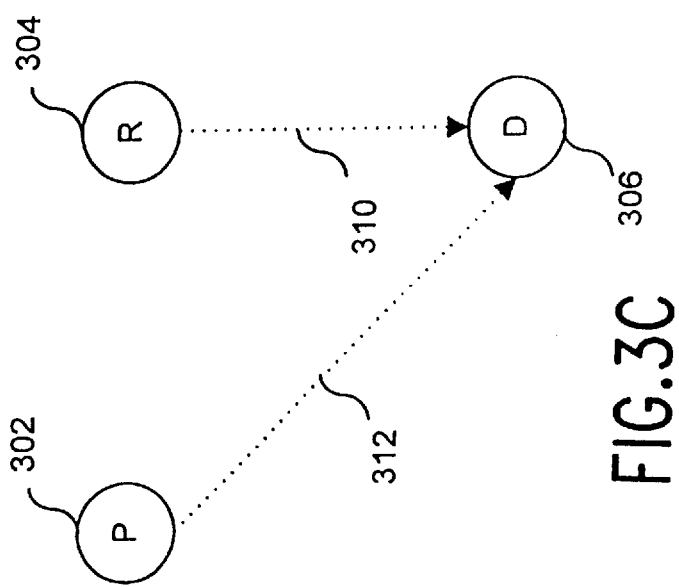

In a step 204, pivot node 302 sends Pivot Capability Information to release node 304. The Pivot Capability Information indicates that pivot node 302 is capable of the RTP function. In a step 206, release node 304 sends Pivot Routing Information to pivot node 302. The Pivot Routing Information contains information necessary for pivot node 302 to establish connection 312 with destination node 306; for example, the Pivot Routing Information can contain the network address of destination node 306 or the address of the terminating end user. In a step 208, release node 304 releases its connection 308 with pivot node 302. The resulting network configuration is shown in FIG. 3C.

In a step 210, pivot node 302 attempts to connect directly to destination node 306 via connection 312. If pivot node 302 is successful in making connection 312 with destination node 306, as indicated by the "yes" branch from step 212, then the call connection is completed in a step 214. The resulting network configuration is shown in FIG. 3D.

Figure 3E:
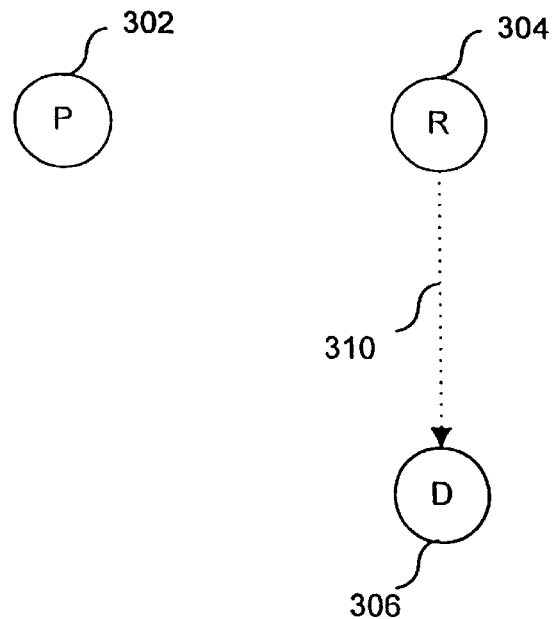

If, however, pivot node 302 is not successful in establishing connection 312, as indicated by the "no" branch out of step 212, then the call is "taken down" (that is, disconnected) in a step 218. This resulting network configuration is depicted in FIG. 3E, which shows no connection, direct or indirect, between pivot node 302 and destination node 306. Thus if the attempt to establish a direct connection between pivot node 302 and destination node 306 fails, the communications path is not completed (for example, the call is dropped).

Figure 4:
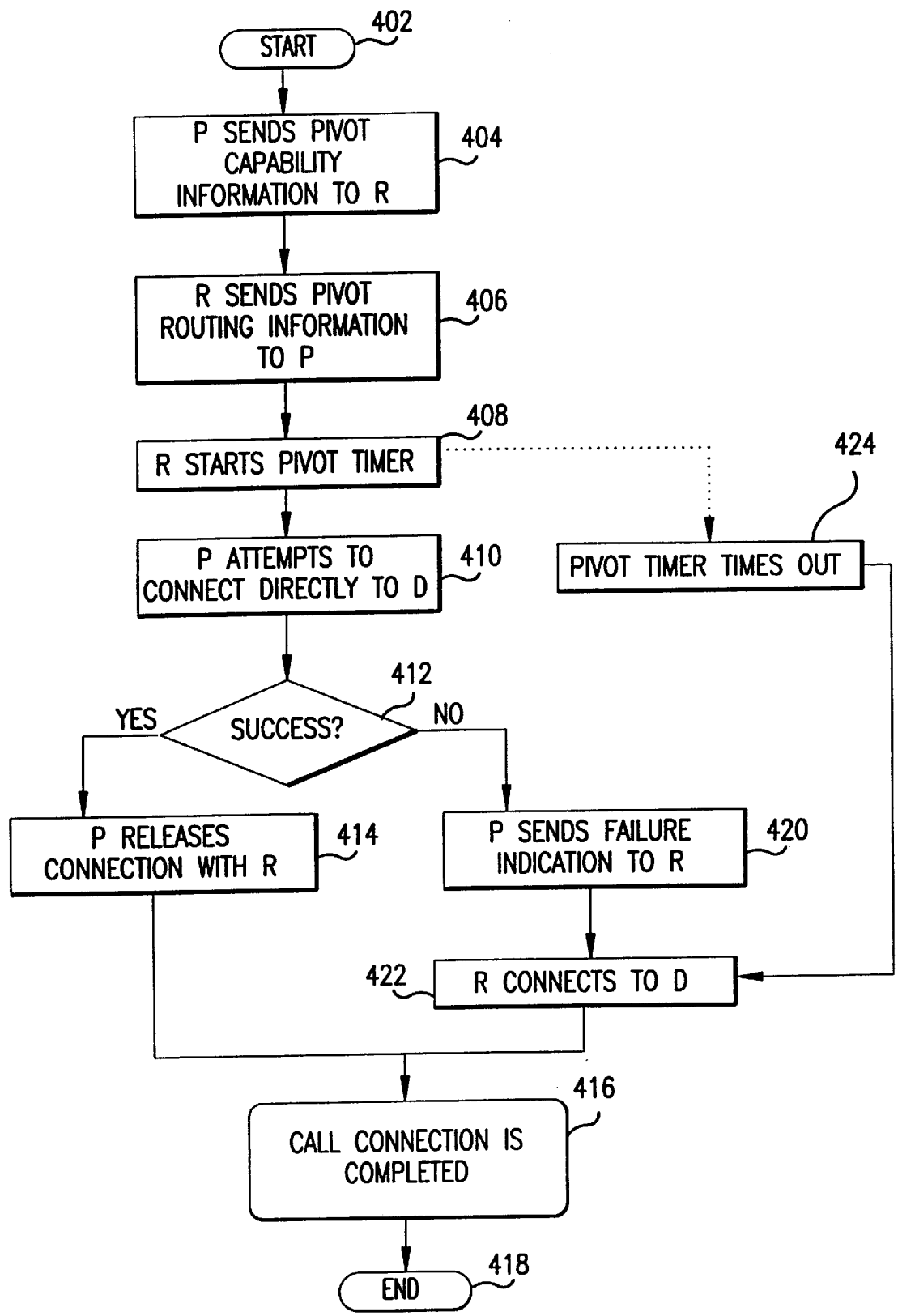
FIG. 4 is a flowchart depicting the operation of the present invention according to a preferred embodiment.

FIG. 4 is a flowchart depicting the operation of the present invention, herein termed Facility Request to Pivot (FRP), according to a preferred embodiment. FIGS. 5A–5E depict the three-node network of FIG. 3, which is also useful in describing the operation of the present invention. As in FIG. 3, pivot node 302 is typically connected, directly or indirectly, to an originating user terminal (not shown), and destination node 306 typically is to be connected, directly or indirectly, to a terminating user terminal (also not shown). According to a preferred embodiment of the present invention, both pivot node 302 and release node 304 support common channel signaling (CCS); destination node 306 may or may not support CCS.

Figure 5E:
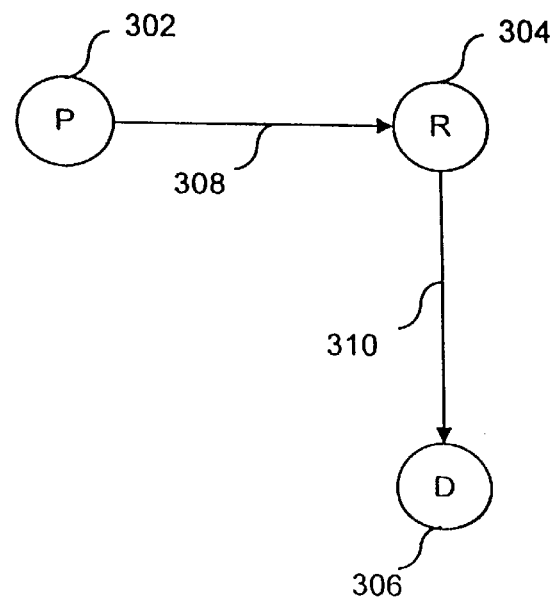
FIGS. 5A–5E depict the three-node network of FIG. 3, which is also useful in describing the operation of the present invention.
Figure 5B:
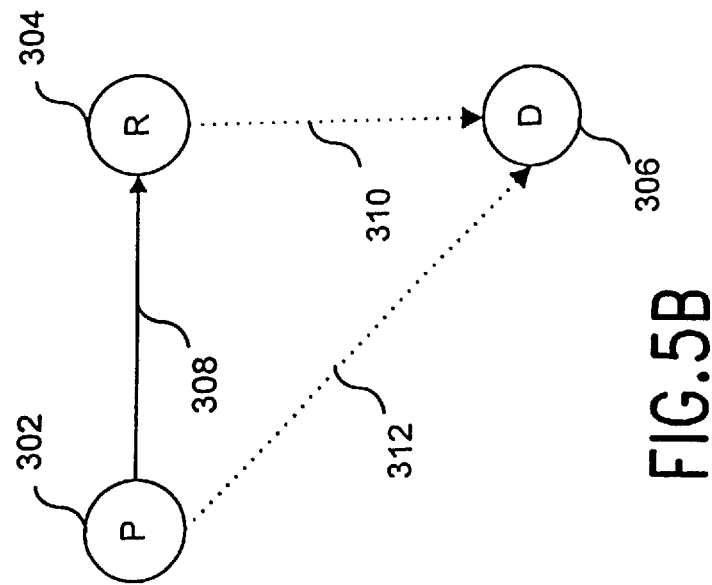
Figure 5A:
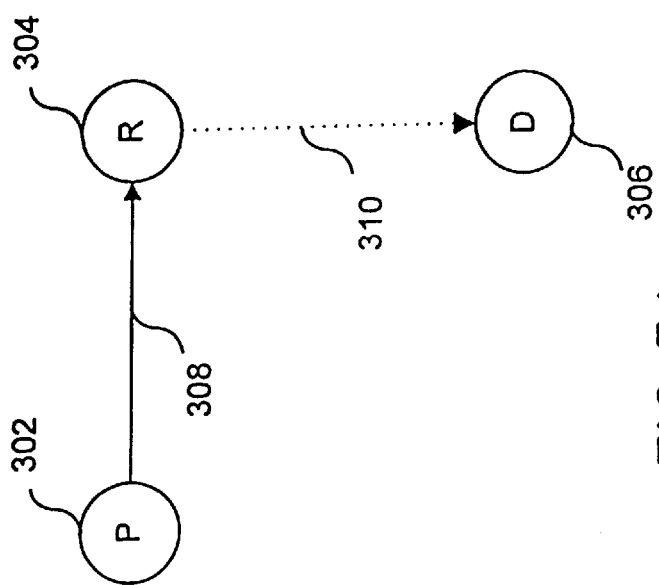

FIG. 5A depicts an initial stage in the connection of pivot node 302 to destination node 306. In FIG. 5A, connection 308 has been made between pivot node 302 and release node 304, and a possible connection 310 has been detected between release node 304 and destination node 306. Thus, an indirect connection is possible between pivot node 302 and destination node 306 via release node 304 using connections 310 and 308.

FIG. 5B depicts a further stage in the connection of pivot node 302 to destination node 306. FIG. 5B depicts a possible direct connection 312 between pivot node 302 and destination node 306. This stage corresponds to start step 402 in FIG. 4.

In a step 404, pivot node 302 sends Pivot Capability Information to release node 304. The Pivot Capability Information indicates that pivot node 302 is capable of the FRP function. In a step 406, release node 304 sends Pivot Routing Information to pivot node 302. The Pivot Routing Information contains the network address of destination node 306 and any other information necessary for pivot node 302 to establish connection 312 with destination node 306.

In a step 408, release node 304 starts a timer (herein termed the Pivot Timer). The purpose of the Pivot Timer is to notify release node 304 when a predetermined time has elapsed. As explained below, when the Pivot Timer expires, release node 304 assumes that the direct connection of pivot node 302 to destination node 306 has failed, and establishes a direct connection 310 to destination node 306.

Figure 5C:
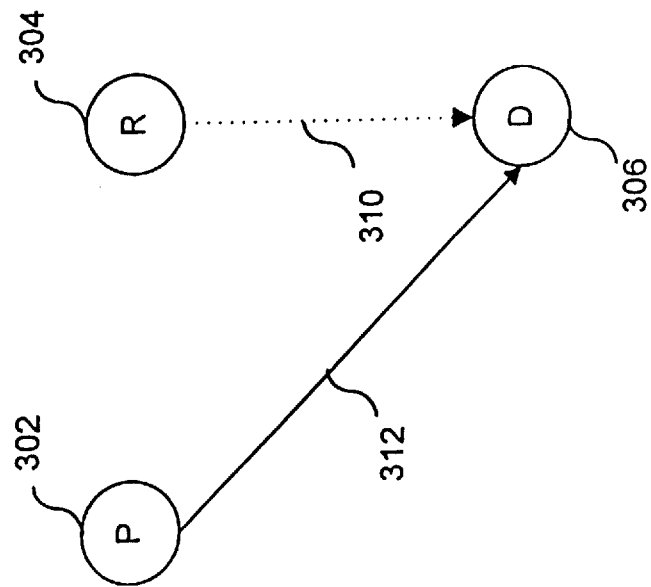
Figure 5D:
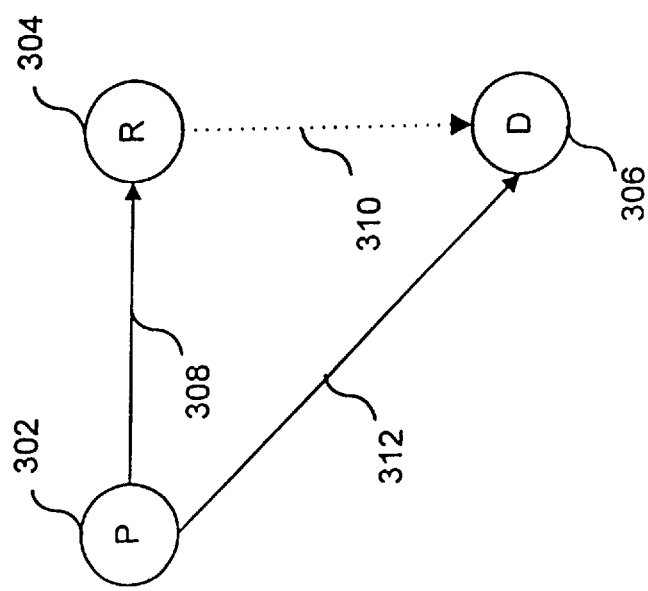

In a step 410, pivot node 302 attempts to connect directly to destination node 306 via connection 312. If the connection is successful, as indicated by the "yes" branch from step 412 and as shown in FIG. 5C, then in a step 414, pivot node 302 releases its connection 308 with release node 304. Thus the call connection is completed in a step 416, as shown in FIG. 5D.

If, however, the connection is unsuccessful, as indicated by the "no" branch from step 412, then in a step 420, pivot node 302 sends a Failure Indication to release node 304. Then in a step 422, release node 304 establishes connection 310 to destination node 306. Thus, the call connection is completed between pivot node 302 and destination node 306 via release node 304 and connections 308 and 310 as shown in a step 416 and in FIG. 5E.

Alternatively, if the connection is unsuccessful but release node 304 receives no Failure Indication, release node 304 will proceed with indirect routing when the Pivot Timer expires, as shown in a step 424. When this happens, the release node 304 completes connection 310 to destination node 306, and in a step 416, the call connection is completed, as shown in FIG. 5E.

Thus, according to the present invention, even though the direct connection between pivot node 302 and destination node 306 fails, an indirect connection via release node 304 is completed, and therefore the call communications path is completed (for example, a call is completed).

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. In a communications network, a system for efficiently routing communications from an originating user terminal to a terminating user terminal, comprising:

a destination node to be connected to the terminating user terminal;

a pivot node, connected to the originating user terminal, for attempting to establish a direct connection to said destination node;

a release node, connected to said pivot node and having a possible connection to said destination node, for establishing a direct connection to said destination node if said pivot node is unsuccessful in establishing said direct connection to said destination node; and means for releasing the connection between said pivot node and said release node if said destination node and said pivot node can be connected directly.

2. The system of claim 1, wherein said release node sends information to said pivot node to enable said pivot node to attempt to establish a direct connection with said destination node.

3. The system of claim 1, wherein said pivot node comprises means for sending a failure indication to said release node.

4. The system of claim 2, wherein said release node comprises a timer, said timer started when said release node sends said information to said pivot node, wherein said failure is indicated by the expiration of said timer.

5. In a communications network having a pivot node, a destination node, and a release node, the release node connected to the pivot node and having a possible connection to the destination node, a system for attempting to replace an indirect communications path from the pivot node to the destination node via the release node with a direct communications path from the pivot node to the destination node, comprising:

means for attempting to establish a direct connection between the destination node and the pivot node;

means for establishing a direct connection between the destination node and the pivot node and releasing the connection between the pivot node and the release node if the destination node and the pivot node can be connected directly; and means for establishing a direct connection between the destination node and the release node if the destination node and the pivot node cannot be connected directly.

6. The system of claim 5, further comprising:

means for sending information from the release node to the pivot node to enable the pivot node to attempt to establish a direct connection with the destination node.

7. The system of claim 5, further comprising means for sending a failure indication from the pivot node to the release node.

8. The system of claim 6, further comprising:

means for starting a timer when said information is sent; and means for connecting the destination node to the release node when said timer expires.

9. In a communications network having a pivot node, a destination node, and a release node, the release node connected to the pivot node and having a possible connection to the destination node, a method for attempting to replace an indirect communications path from the pivot node to the destination node via the release node with a direct communications path from the pivot node to the destination node, comprising the steps of:

(1) attempting to establish a direct connection between the destination node and the pivot node;

(2) if the destination node and the pivot node can be connected directly, establishing a direct connection between the destination node and the pivot node and releasing the connection between the pivot node and the release node; and (3) if the destination node and the pivot node cannot be connected directly, establishing a direct connection between the destination node and the release node.

10. The method of claim 9, further comprising the step of sending information from the release node to the pivot node to enable the pivot node to attempt to establish a direct connection with the destination node.

11. The system of claim 9, further comprising the step of sending a failure indication from the pivot node to the release node.

12. The method of claim 10, further comprising the steps of:

starting a timer when said information is sent; and connecting the destination node to the release node when said timer expires.

* * * * *